United States Patent [19]
Glancy et al.

[11] Patent Number: 5,011,200
[45] Date of Patent: Apr. 30, 1991

[54] LATCH WITH PRELOAD INDICATION

[75] Inventors: Jerry L. Glancy, Wichita; John C. Birch, Derby, both of Kans.

[73] Assignee: The Boeing Company, Seattle, Wash.

[21] Appl. No.: 439,337

[22] Filed: Nov. 21, 1989

[51] Int. Cl.$^5$ .............................................. E05C 5/00
[52] U.S. Cl. .................... 292/113; 292/DIG. 60; 73/862.39
[58] Field of Search ............ 244/131, 132, 139.4, 244/53 R; 116/DIG. 34, 281, 282; 73/802, 862.38, 862.39, 862.42, 862.01, 862.02; 280/634; 292/113, DIG. 31, 110, 256.69, DIG. 49, DIG. 60

[56] References Cited

U.S. PATENT DOCUMENTS

| | | | |
|---|---|---|---|
| 1,247,249 | 11/1917 | Felcyn | 73/862.39 |
| 2,894,777 | 7/1959 | Hogan . | |
| 3,347,578 | 10/1967 | Sheenan et al. . | |
| 3,943,882 | 3/1976 | Sollack et al. . | |
| 4,045,063 | 8/1977 | Fletcher et al. | 292/110 |
| 4,053,177 | 10/1977 | Stammreich et al. | 292/113 |
| 4,116,479 | 9/1978 | Poe | 292/113 |
| 4,531,769 | 7/1985 | Glancy . | |
| 4,538,843 | 9/1985 | Harris . | |
| 4,557,441 | 12/1985 | Aspinall | 244/129.4 |
| 4,784,404 | 11/1988 | Kowatsch | 280/634 X |

FOREIGN PATENT DOCUMENTS 243658  11/1965  Austria .

Primary Examiner—Eric K. Nicholson
Attorney, Agent, or Firm—Finnegan, Henderson, Farabow, Garrett & Dunner

[57] ABSTRACT

An improved latch with preload indicator for securing together a pair of hinged cowlings surrounding an aircraft engine. The latch comprises a hook which engages a keeper attached to one of the cowlings, a handle attached to the other cowling and mounted with the hook along a common pivot, and a hook-handle spreader spring with a free end that moves relative to and extends through the handle to provide indication of latch preload. The visual indication of the preload eliminates the need for maintenance personnel to measure the handle closing force during installation, rigging or maintenance of the cowlings.

15 Claims, 2 Drawing Sheets

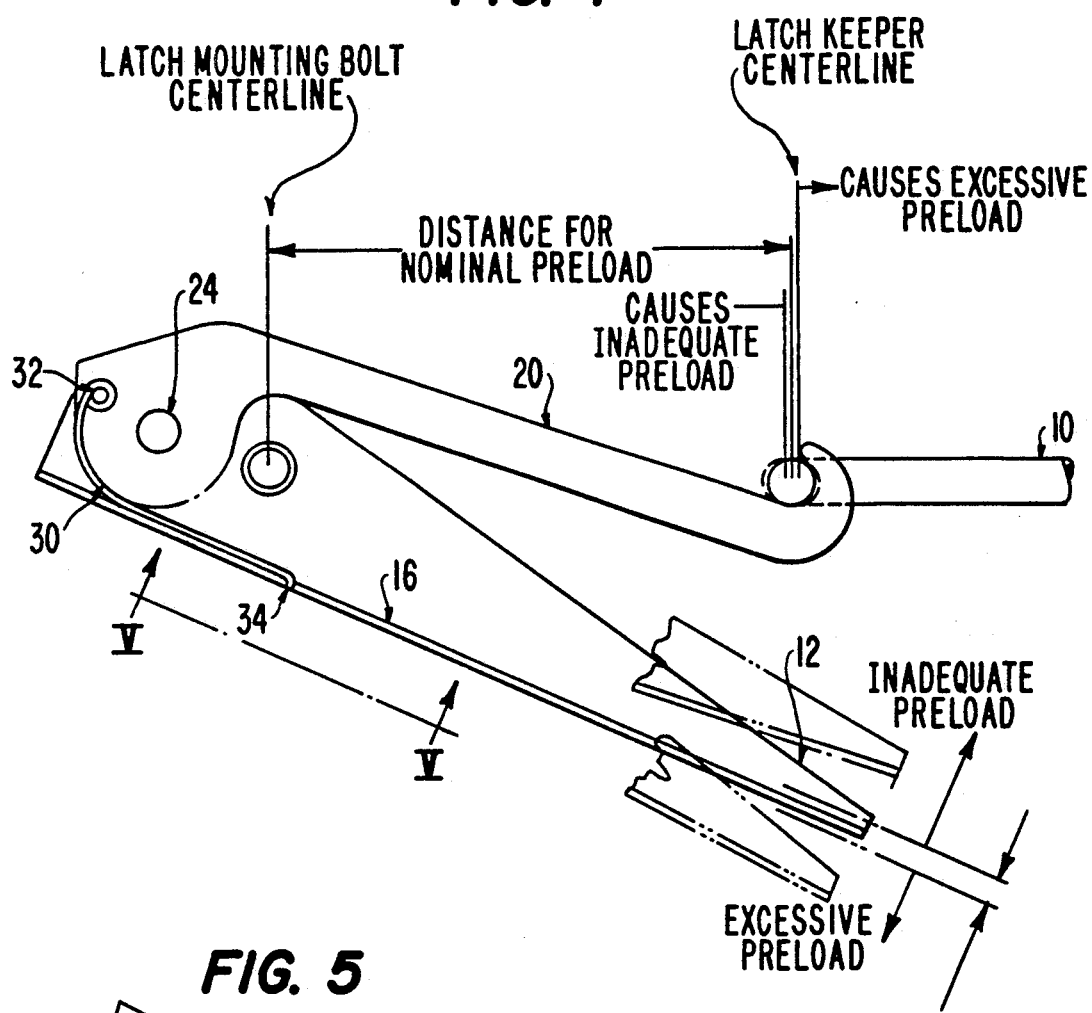
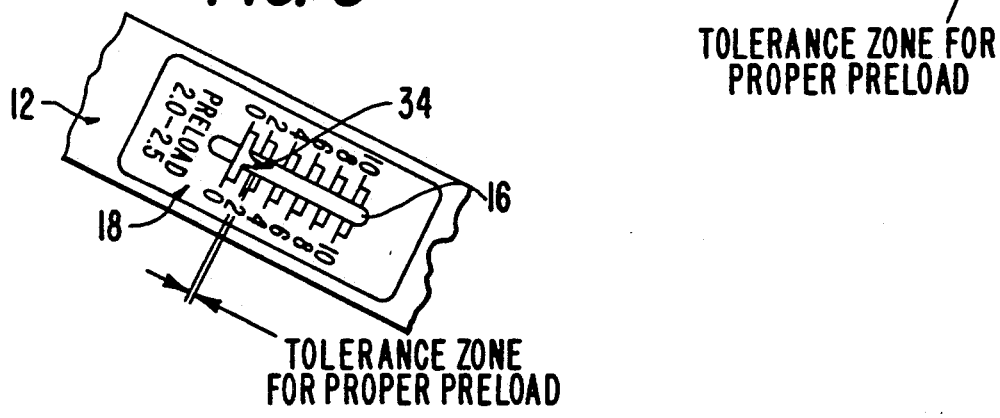

LATCH WITH PRELOAD INDICATION

BACKGROUND OF THE INVENTION

1. Field of the Invention

The present invention relates to a latch for securing hinged cowlings surrounding an aircraft engine, and in particular, a latch with a preload indicator.

2. Description of Related Art

In the aircraft industry a preload latch applies a preload or predetermined load to a cowling structure to prevent or eliminate relative motion between the pair of hinged cowlings during aircraft operating conditions. It is known in the aircraft industry that an excessive amount of latch preload can cause damage to the cowling structure and/or the latch and that too little preload can cause excessive wear on mating cowlings due to relative motion.

During the initial design stage of the cowling, the latch loads are determined and included in the cowling installation procedures, rigging instructions and maintenance manuals. It is known that the force on the latch hook is directly related to the amount of force needed to rotate the latch handle to the closed position.

The method used to determine the correct preload has been to measure the maximum force to close the latch handle. The measurement is usually accomplished with a plunger type spring scale where the scale plunger is positioned to measure the force needed to move the handle to the closed position. The maximum force is noted, and if inadequate or excessive, the latch or keeper is adjusted and another measurement is taken. This is repeated until the proper preload is reached.

Prior to the subject invention, aircraft maintenance personnel, on occasion, would fail to properly adjust preload during routine checks, and sometimes during cowling rigging or installation, because a plunger-type spring scale was not readily available to measure the handle force. The correct latch preload, therefore, was sometimes not achieved.

Conventional latches for securing a pair of hinged cowlings surrounding an aircraft engine do not provide preload indication. Examples of such a conventional latch are disclosed in U.S. Pat. No. 4,531,769 to Glancy and U.S. Pat. No. 4,538,843 to Harris.

In the past, mechanisms using spring movement have been use to provide an indication of the force imposed in a particular connection, such as disclosed in U.S. Pat. No. 3,943,882 to Sollak et al. and Austrian Patent No. 243,658. These prior art latches, however, did not include a mechanism to indicate preload forces.

The improved latch is simple to design, rugged in construction and requires no additional parts over a typical latch since the preload indicator replaces a spring and accomplishes the same function as the replaced spring. Not only does the improve latch eliminate the need for maintenance personnel to provide a plunger type spring scale, but it also provides an additional safety feature during the life of the cowling in that the latch preload can be checked each time the cowling is closed and be adjusted at that time.

Advantages of the invention are set forth in part in the description which follows, and in part will be obvious from the description, or may be learned by practice of the invention.

SUMMARY OF THE INVENTION

In accordance with the invention, as embodied and broadly described herein, a latch for selectively securing together a pair of relatively movable panels in an aircraft, comprises a latch keeper attached to one of the panels, a latch handle pivotally attached to the other panel and movable between open and closed positions, a latch hook connected to the handle and disposed to selectively engage the keeper, and means for visually indicating a preload engagement force between the hook and the keeper, the force existing when the latch is closed.

Preferably, the indicating means comprises a leaf spring having first and second ends, the first end being attached to the hook and the second end being disposed to move relative to a slot in the handle. The position of the second end indicates latch preload by projecting into the slot to form a visual indicator, preferably calibrated to be read when the latch hook is just engaged to the keeper but before the handle is closed.

It should be understood that both the foregoing general description and the following detailed description are exemplar and explanatory only and are not limited by the invention as claimed.

BRIEF DESCRIPTION OF THE DRAWINGS

The accompanying drawings, which are incorporated in and constitute a part of this specification, illustrate an embodiment of the invention and together with the description, serve to explain features and advantages of the invention.

FIG. 4 is a side cross-sectional view of the invention, similar to FIG. 1, depicting various operative positions.

FIG. 5 is a partial top view of the invention taken along line V—V of FIG. 4.

DESCRIPTION OF THE PREFERRED EMBODIMENT

Reference will now be made in detail to the present preferred embodiment of the invention, an example of which is illustrated the accompanying drawings.

In accordance with the invention, the latch for selectively securing together a pair of relatively moveable panels in an aircraft comprises a latch keeper attached to one of the panels, a latch handle pivotally attached to the other panel for movement between open and closed positions, and a latch hook connected to the handle and disposed to selectively engage the keeper. As embodied herein and depicted in FIGS. 1 and 4, keeper 10 is attached to one panel (not shown) and is adjustable with respect to that panel to provide proper preload between the two panels.

As depicted in FIGS. 1, 2, 4, and 5, latch handle 12 is pivotally attached to a latch mounting bolt 14, which is supported by the other panel, permitting handle 12 to be movable between open and closed positions. Latch hook 20 is connected to handle 12 and designed to selectively engage keeper 10.

Figure 1:
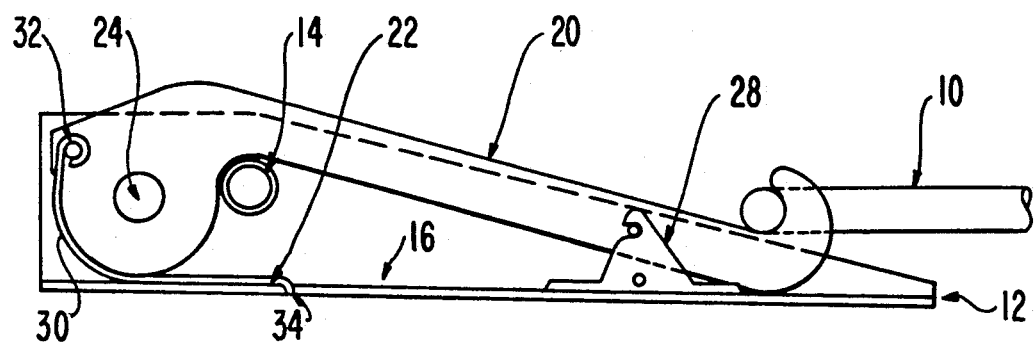
FIG. 1 is a side cross-sectional view of a latch of the invention taken along the line I—I of FIG. 2.

Preferably, when the latch is closed, the panels, which are preferably engine cowlings, can be formed so that the handle is flush with the surface of the cowlings and, thus, aerodynamically streamlined. As depicted in FIG. 1, mounted on handle 12 is a safety lock 28 which engages with a pin on hook 20 to lock the hook and handle in a closed position.

In accordance with the invention, the latch comprises means for visually indicating a preload engagement force between the hook and the keeper, which force will exist when the latch is closed. As depicted and embodied in FIGS. 1-5, the preload indicating means comprises a hook handle spreader 30. The hook-handle spreader 30 comprises a leaf spring having first and second ends 31, 33 respectively. First end 31 (FIG. 3) is attached to hook 20 by a pin 32 and second end 33 is freely disposed for movement relative to elongated slot 16 in handle 12 (best shown in FIGS. 1 and 4). Second end 33 of spreader 30 has a tab bent 90° outward to form indicator 34. As an alternative embodiment, a separate indicating element, such as a stud rivet may be attached to second end 33 to form the indicator. Indicator 34 moves in slot 16, wherein the position of indicator 34 indicates the latch preload indication preferably occurring when the hook is engaged to the keeper, and the cowlings are engaged with each other at the latch, before the handle is closed to a locked position.

Figure 2:
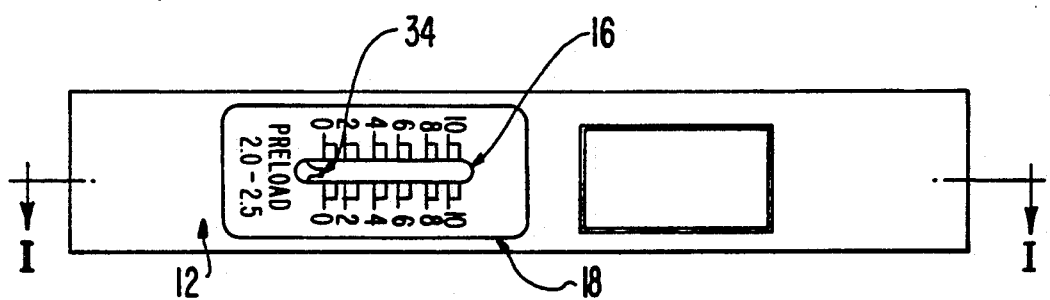
FIG. 2 is a plan view of a latch of the invention.
Figure 3:
FIG. 3 is a plan view of an embodiment of the spreader spring of the invention, prior to installation.

The means for visually indicating the preload further comprises, as embodied and depicted in FIGS. 2 and 5, a label or surface etching 18 on the surface of handle 12 adjacent slot 16 which provides numerical indicia for the relative value of the preload. As depicted in FIG. 1, the handle 12 is further provide with a wear resistant coating 22 to reduce wear.

Preferably, spreader spring 30 indicates an engagement force between hook 20 and keeper 10 as handle 12 and hook 20 separate through rotation at common pivot 24, due to the spreader spring force against the handle.

In operation as depicted by FIGS. 4 and 5, the position of handle 12 and hook 20 form an angle at their common pivot 24. There is a direct relationship between the latch preload and the angle between the open latch handle and hook when the hook is engaged to the keeper. The preload indicator 34, in reality indicates that angle, and thus is readable when the hook and keeper are engaged and the panels are in abutting relation, before the handle is closed, and provides an indication of the engagement force between the hook and keeper when the handle is closed.

When panels or cowling halves are firmly seated against each other, a proper preload for the latch exists. A distance for nominal preload extends between the latch mounting bolt centerline and the latch keeper centerline. As keeper 10 and the load imposed on the cowling structure is adjusted, the dimension between the centerlines, the nominal preload distance, changes, thus causing either more or less preload. When the dimension is incorrect, the preload becomes either excessive or inadequate. These changes are reflected in the angle between hook 20 and handle 12 and visually indicated by the invention.

When the keeper is adjusted to cause excessive preload, the distance between the keeper and latch mounting bolt centerlines increases and the angle between the hook and handle increases. When the angle increases, the indicator will rest in the higher indicia of preload label 18 on the handle, once the hook and keeper are engaged and the latch is closing. Likewise, when the keeper is adjusted to cause inadequate preload, the distance between centerlines will decrease as will the angle between the hook and handle, thus the visual indicator will rest in the lower part of slot 16 before the handle is closed, indicating inadequate preload.

A tolerance zone for proper preload exists for each latch and cowling structure. An illustrative normal tolerance zone may exist for example between 2 and 2.5, which is marked by the indicia on the handle. The relationship between the indicia and the preload in pounds is developed during the design stage of the latch. The load requirement in pounds and associated indicia on the handle for each specific latch is then entered into a maintenance handbook. Once the proper handle-hook angle has been determined, that angle for a particular preload in one design including tolerances will remain constant from unit to unit in production. Upon determining that angle and noting it on the handle label or surface etching 18, as shown in FIG. 5, and upon installation, the maintenance personnel can observe the preload indicator when closing the latch and if required make the necessary preload adjustment.

Other embodiments of the invention will be apparent to those skilled in the art from consideration of the specification and practice of the invention disclosed herein. It is intended that the specification be considered exemplary only, with a true scope and spirit of the invention being indicated by the following claims.

What is claimed is:

1. A latch for selectively securing together a pair of relatively movable panels in an aircraft, said latch comprising:
   a latch keeper attached to one of the panels;
   a latch handle pivotally attached to the other panel and moveable between open and closed positions;
   a latch hook connected to said handle and disposed to selectively engage said keeper; and
   means for visually indicating the relative value of a preload engagement force between said hook and said keeper, said force existing when said latch is closed.

2. The latch according to claim 1, wherein said indicating means comprises a leaf spring having first and second ends, said first end being attached to said hook and said second end being disposed for movement relative to a slot in said handle, a position of said second end indicating latch preload.

3. The latch according to claim 2, wherein said second end of said spring projects into said slot to form a visual indicator.

4. The latch according to claim 2, also including means visually disposed adjacent said slot for indicating the relative value of said preload corresponding to positions of said second end.

5. A latch for selectively securing together a pair of relatively moveable panels in an aircraft, said latch comprising:
   a latch keeper attached to one of the panels;
   a latch handle pivotally attached to the other panel and moveable between open and closed positions;
   a latch hook connected to said handle and disposed to selectively engage said keeper;
   means for visually indicating a preload engagement force between said hook and said keeper, said indicating means comprising a leaf spring having first and second ends, said first end being attached to said hook and said second end being disposed for movement relative to a slot in said handle, wherein a position of said second end when said panels are in abutting relation but before said handle is closed, indicates latch preload when said handle is closed; and means visually disposed adjacent said slot for indicating the relative value of said preload corresponding to the position of said second end.

6. A latch for securing together a pair of hinged cowlings surrounding an aircraft engine, comprising:
- a latch keeper attached to one of the hinged cowlings;
- a latch handle pivotally attached to the other hinged cowling;
- a latch hook pivotally mounted to said handle and disposed to selectively engage said keeper; and
- a hook-handle spreader having first and second ends, said first end being attached to said hook and said second end being free to move relative to said handle, wherein said free second end of said hook-handle spreader provides indication of the relative value of latch preload.

7. The latch according to claim 6, wherein the free end of said hook-handle spreader comprises a tab bent outward to form a visual indicator.

8. The latch according to claim 6, wherein a separate indicating element is disposed relative to the free end of said hook-handle spreader to form a visual indicator.

9. The latch according to claim 7 or 8, wherein said handle means has an elongated slot for receiving said visual indicator.

10. The latch according to claim 9, also including means visually disposed adjacent said slot for indicating the relative value of said preload corresponding to positions of said second end.

11. The latch according to claim 10, wherein the relative value of said preload corresponding to the positions of said second end, is readable when said hook and keeper are engaged, and said cowlings are in abutting relation against each other at said latch, prior to closing said handle to a locked position.

12. The latch according to claims 6, wherein said hook-handle spreader is a spring.

13. A latch according to claim 12, wherein said spring is a leaf spring.

14. A latch with preload indication for securing together a pair of relatively moveable members, comprising:
- a latch keeper attached to one of the members;
- a latch handle pivotally attached to the other member;
- a latch hook pivotally mounted to said handle at a common pivot; and
- a hook-handle spreader including first and second ends, said first end being attached to said hook and said second end being disposed for movement, relative to a slot in said handle, wherein a position of said second end of said hook-handle spreader in said slot indicates the relative value of latch preload.

15. The latch according to claim 14, wherein said second end indicates latch preload when said hook and keeper are engaged, before said handle is closed.

* * * * *